(12) United States Patent
Maquinay (10) Patent No.: US 12,120,361 B2
(45) Date of Patent: Oct. 15, 2024

(54) MULTIMEDIA SERVER INTENDED TO BE INSTALLED ON BOARD AN AIRCRAFT, ELECTRONIC ENTERTAINMENT SYSTEM COMPRISING SUCH A SERVER, METHOD FOR CONFIGURING SOFTWARE OF SUCH A SERVER AND ASSOCIATED COMPUTER PROGRAM

(71) Applicant: THALES, Courbevoie (FR)

(72) Inventor: Guillaume Maquinay, Mérignac (FR)

(73) Assignee: THALES, Courbevoie (FR)

( * ) Notice: Subject to any disclaimer, the term of this patent is extended or adjusted under 35 U.S.C. 154(b) by 40 days.

(21) Appl. No.: 17/775,960

(22) PCT Filed: Nov. 5, 2020

(86) PCT No.: PCT/EP2020/081073
§ 371 (c)(1),
(2) Date: Jul. 22, 2022

(87) PCT Pub. No.: WO2021/094180
PCT Pub. Date: May 20, 2021

(65) Prior Publication Data
US 2022/0385951 A1 Dec. 1, 2022

(30) Foreign Application Priority Data
Nov. 12, 2019 (FR) .................................... 19 12615

(51) Int. Cl.
*H04N 21/214* (2011.01)
*B64D 11/00* (2006.01)
*G06F 9/455* (2018.01)

(52) U.S. Cl.
CPC ..... *H04N 21/2146* (2013.01); *B64D 11/0015* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

2003/0130769 A1* 7/2003 Farley ................ H04B 7/18506
701/3
2003/0140288 A1 7/2003 Loaiza et al.
(Continued)

FOREIGN PATENT DOCUMENTS

| EP | 3 026 557 A1 | 6/2016 |
| EP | 3 096 522 A1 | 11/2016 |
| WO | WO 91/03788 A1 | 3/1991 |

OTHER PUBLICATIONS

French Search Report, from the French Patent Office in counterpart French Application No. FR 1912615, dated Apr. 1, 2020.
(Continued)

*Primary Examiner* — Omar S Parra
(74) *Attorney, Agent, or Firm* — ArentFox Schiff LLP (57) ABSTRACT

This multimedia multimedia server for installation on board an aircraft comprises at least one network switch card configured to manage communications with at least one network of an on-board local-area network and an external communication network; and at least one other electronic card selected from the group consisting of: a data storage card and a compute card. At least one network switch card also includes a software configuration module suited to obtain a list of software function(s) to be installed on at least one other electronic card; to download, from electronic equipment external to the multimedia server the one or more software functions from the list obtained; and to provide the corresponding downloaded software functions to each other respective electronic card.

16 Claims, 8 Drawing Sheets

(56) References Cited

U.S. PATENT DOCUMENTS

2014/0075506 A1* 3/2014 Davis ................ H04B 7/18508
   726/3
2017/0242679 A1   8/2017 Sangameswaran et al.
2017/0344355 A1* 11/2017 Sarkar ...................... G06F 8/65
2018/0367211 A1* 12/2018 Loots ..................... H04L 67/34

OTHER PUBLICATIONS

International Search Report and Written Opinion, issued by International Searching Authority in corresponding International Application No. PCT/EP2020/081073, mailed on Nov. 26, 2020.

* cited by examiner

MULTIMEDIA SERVER INTENDED TO BE
INSTALLED ON BOARD AN AIRCRAFT,
ELECTRONIC ENTERTAINMENT SYSTEM
COMPRISING SUCH A SERVER, METHOD
FOR CONFIGURING SOFTWARE OF SUCH
A SERVER AND ASSOCIATED COMPUTER
PROGRAM

CROSS-REFERENCE TO RELATED APPLICATIONS

This application is a National Stage Entry of International Patent Application No. PCT/EP2020/081073, filed on Nov. 5, 2020, which claims priority to French Application No. 1912615, filed on Nov. 12, 2019. The disclosures of the priority applications are incorporated in their entirety herein by reference.

FIELD OF THE INVENTION

This invention concerns a multimedia server aiming at being installed on board an aircraft and connected to at least one on-board entertainment terminal of the aircraft via a local-area network (LAN).

The invention also concerns an electronic entertainment system for installation on board an aircraft, wherein the system comprises at least one such entertainment terminal and one such multimedia server.

The invention also concerns a method for software configuration of such a multimedia server, wherein the method is carried out by the multimedia server.

The invention also concerns a computer program including software instructions that, upon being executed by a computer, carry out such a software configuration method.

Thus, the invention concerns the field of in-flight entertainment (IFE) systems that are mainly found on board long-distance commercial flights.

BACKGROUND OF THE INVENTION

As known per se, such an IFE system comprises a plurality of entertainment terminals also known as user terminals, that are generally in the form of individual screens or tablets. Each entertainment terminal is integrated, for example, into the passenger's seat or the seat in front of the passenger.

Thus arranged, these terminals allow passengers to view multimedia content during the flight (e.g. films, TV programs, games, or music) and to be informed of the progress of the flight (altitude, speed, current position, progress, etc.).

In some cases, these terminals also allow for the provision of certain practical information, e.g. concerning the destination airport, and to broadcast announcements from the crew in the form of audio and/or video.

The entertainment terminals are generally connected by a wired or wireless network to an on-board multimedia server that is also part of the IFE system.

Depending on the various possible implementations of the IFE system, in order to access the computerised content and utilise its function, each terminal accesses the on-board multimedia server via the network or uses its own storage space.

Certain systems also offer entertainment terminals that can carry out at least some of their functions from their storage space, and certain others do so from their on-board multimedia server.

Thus, in order to be accessible, the computerised content is first loaded onto the on-board multimedia server and then, as needed, distributed to the entertainment terminals via the on-board local-area network for storage in their storage space.

However, the software configuration of such an IFE system is generally burdensome and complicated.

SUMMARY OF THE INVENTION

Thus, the objective of the invention is to provide a multimedia server aiming at being installed on board an aircraft that is connected to at least one entertainment terminal, allowing for easier management of the software configuration of the server, in particular the initial software configuration after it leaves the factory.

For this purpose, the invention concerns a multimedia server aiming at being installed on board an aircraft that is connected to at least one on-board entertainment terminal of the aircraft via a local-area network (LAN), wherein the multimedia server comprises:
  at least one network switch card configured to manage communications with at least one network of the on-board local-area network and an external communications network, and
  at least one other electronic card selected from the group consisting of: a data storage card and a compute card,
  wherein the at least one network switch card further includes a software configuration module, wherein the software configuration module is adapted to obtain a list of software function(s) to be installed on at least one other electronic card; adapted to download, from electronic equipment external to the multimedia server the one or more software functions from the list obtained; and adapted to provide the corresponding downloaded software functions to each other respective electronic card. Thus, with the multimedia server according to the invention, the software configuration of the various electronic cards of the server, in particular the first software configuration of the electronic cards after they leave the factory, is carried out via the network switch card that also includes the software configuration module.

Thus, the one or more network switch cards are responsible for the initial software configuration of the multimedia server, and subsequently for maintaining the operating condition of its software. Furthermore, if the one or more network switch cards are inoperable and thus unable to carry out the software configuration of the multimedia server, the multimedia server will in any case be inoperable, given that the one or more network switch cards are malfunctioning.

Optionally, the multimedia server additionally includes at least two network switch cards, each acting as a backup for the other, in order to further improve the reliability of the multimedia server.

'Software function' refers to any function carried out by a software component, whether it is firmware or software. Thus, 'software functions' in the broader sense refer to a set of software instructions suited to implement the function when run by a processor.

According to other advantageous aspects of the invention, the multimedia server comprises one or more of the following characteristics, alone or in any combination technically possible:
  each network switch card further includes the software configuration module;

the software configuration module is included in a virtual machine (VM), at least one respective network switch card preferably including a hypervisor layer adapted to download, from the external electronic equipment, an image of the virtual machine (75) and then to run the image of the VM.

the software configuration module is further adapted to verify the integrity of each downloaded software function, preferably by calculating a checksum for each downloaded software function and then comparing each calculated checksum with a respective reference checksum contained in the obtained list;

each electronic card includes a hypervisor layer adapted to communicate with the network switch card and request the one or more software functions previously downloaded by the network switch card, a downloaded software function being preferably an image of a virtual machine suited to be run on the respective other electronic card, and the hypervisor layer of the respective other electronic card being then further adapted to run the image obtained via the respective network switch card;

the multimedia server is in the form of an electronics case including a backplane card and a plurality of electronic cards connected to the backplane card, each electronic card being selected from the group consisting of: a network switch card, a data storage card, and a compute card, the plurality of electronic cards preferably including electronic cards of various types, preferably each of the types, of the group consisting of: a network switch card, a data storage card, and a compute card; and several electronic cards are of the same type selected from the group consisting of: a network switch card, a data storage card, and a compute card, preferably several electronic cards being of the same type for each of the types of the group consisting of: a network switch card, a data storage card, and a compute card.

The invention also concerns an electronic entertainment system aiming at being installed on board an aircraft, wherein the system comprises:

at least one entertainment terminal and a multimedia server connected to each entertainment terminal via an on-board local-area network, wherein the multimedia server is as defined supra.

The invention also concerns a method for software configuration of a multimedia server aiming at being installed on board an aircraft and connected to at least one entertainment terminal installed on board the aircraft via an on-board local-area network, the multimedia server comprising at least one network switch card configured to manage communications with at least one network of the on-board local-area network and an external communications network, and at least one other electronic card selected from the group consisting of: a data storage card and a compute card, at least one network switch card further including a software configuration module;

wherein the method is carried out by the software configuration module and includes the following steps:

obtaining a list of software function(s) to be installed on at least one other electronic card;

downloading, from an electronic equipment external to the multimedia server, the one or more software functions from the list obtained; and providing the one or more corresponding downloaded software functions to each respective other electronic card.

The invention also concerns a computer program including software instructions that, upon being executed by a computer, carry out a software configuration method as defined supra.

BRIEF DESCRIPTION OF THE DRAWINGS

These characteristics and advantages of the invention will become clearer upon a reading of the following description, given by way of example only and without limitation, by reference to the drawings appended hereto, in which.

DETAILED DESCRIPTION

Figure 1:
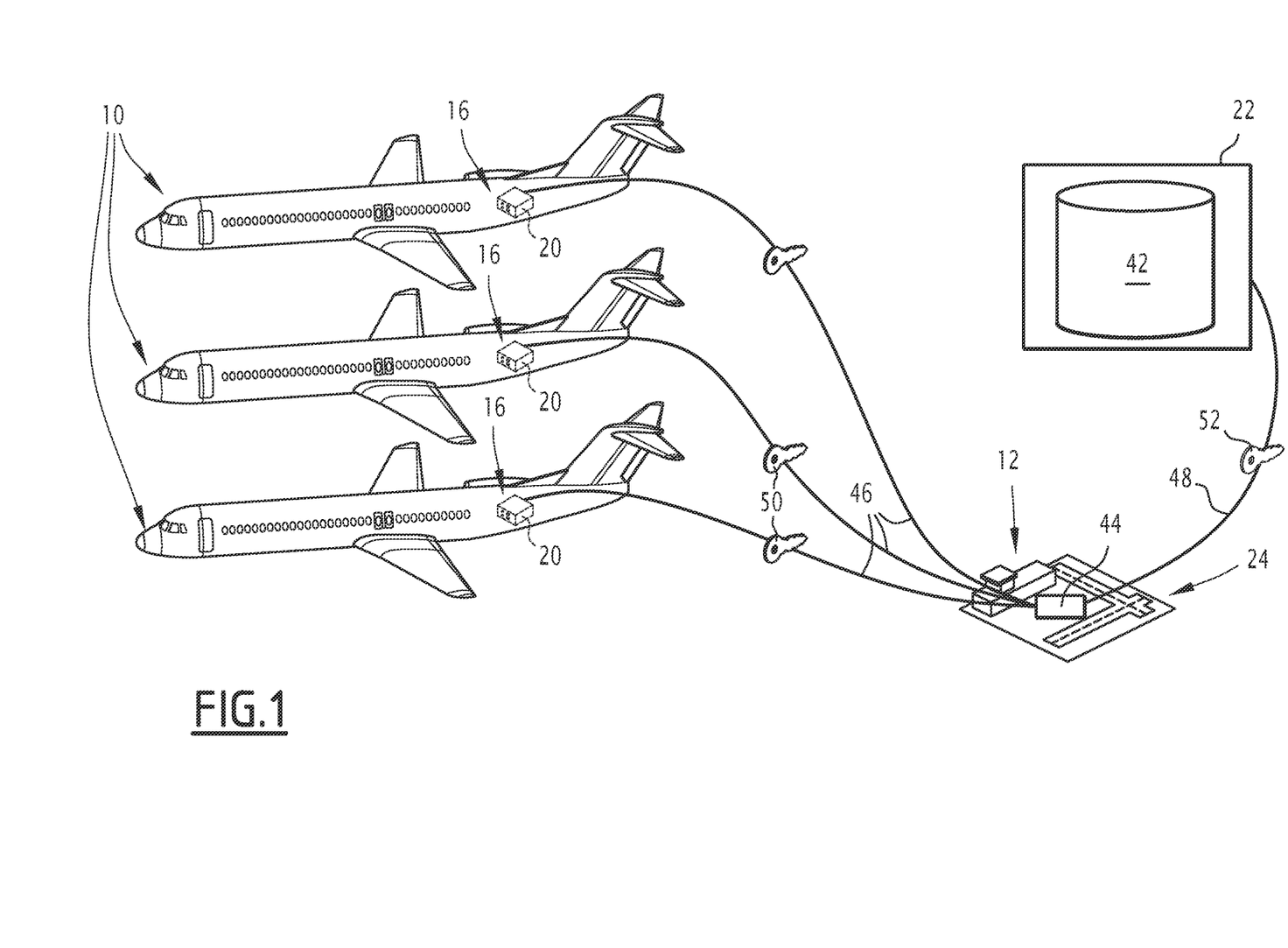
FIG. 1 is a schematic view of several aircraft, each of them equipped with an electronic entertainment system comprising entertainment terminals (not shown) and a multimedia server, wherein each aircraft is near its parking area in an airport and each multimedia server on board a respective aircraft is then connected to external electronic equipment via a communications network external to the aircraft.

In FIG. 1, several aircraft 10 are positioned near their respective parking areas in an airport 12. Each aircraft 10 is equipped with an electronic entertainment system 16 comprising entertainment terminals (not shown) and a multimedia server 20.

Each aircraft 10 is preferably an aeroplane, in particular a commercial aeroplane, e.g. a long-haul aeroplane. Each aircraft 10 is suited to transport passengers, in particular several dozen passengers or several hundred passengers.

Each entertainment system 16 installed on board a respective aircraft 10 is configured to broadcast multimedia content to the passengers of the aircraft 10, in particular during the flight (e.g. films, TV programs, games, or music), and/or information on the progress of the flight (altitude, speed, current position, progress, etc.).

Optionally, each entertainment system 16 is additionally configured to broadcast practical information, e.g. concerning the destination airport, e.g. via audio and/or video announcements.

Each entertainment terminal is a known-art terminal, and is connected to the multimedia sever 16 via a local-area network (LAN) (not shown) on board the respective aircraft 10.

For example, each entertainment terminal is affixed to or integrated into the passenger's seat, or affixed to or integrated into the back of the seat in front of the passenger's seat. Typically, the seats are arranged in rows within the aircraft 10.

Each entertainment terminal, also known as a 'user terminal', includes a user interface UI, a processing module, an application module, and a telecommunications module. For example, the UI includes a touchscreen, or a screen and a keyboard. The application module includes one or more application blocks. The telecommunications module includes a control unit and one or more telecommunications interfaces suited to send and receive data. The processing module is suited to control and coordinate the functioning of the application module, the UI, and the telecommunications module. In one embodiment, it includes a processor and a memory, e.g. a hard disk or any other storage area suited to store computerised content, in particular received via the telecommunications module.

Each entertainment terminal is suited to deliver the content provided by the IFE system to the passengers. For example, after a passenger selects a field shown on the screen of the UI of their entertainment terminal, the processing module is suited to identify that a menu of one of the applications, e.g. a list of films, must then be displayed. Then, upon the detection of the selection of a film by the passenger, the processing module is suited to begin displaying the film on the screen. In addition to films, various content may be provided by the applications: Multimedia content, e.g. films, TV programs, games, or music, information concerning the flight (altitude, speed, etc.) and its progress (e.g. using a moving map), announcements (audio and/or video) of the crew. The screen is suited to show images corresponding to computerised content distributed from the multimedia server 20. More specifically, the computerised content is received via the telecommunications module from the multimedia server 20 in the form of a stream or stored in the memory of the terminal after being downloaded from the multimedia server 20 via the telecommunications module.

The multimedia server 20 is connected to at least one entertainment terminal, preferably to each entertainment terminal, via an on-board local-area network.

The multimedia server 20 is suited to be connected to external electronic equipment 22 via a communications network 24 external to the aircraft 10, in particular when the aircraft 10 on which it is installed is near its parking area in the airport 12, as shown in FIG. 1.

Figure 2:
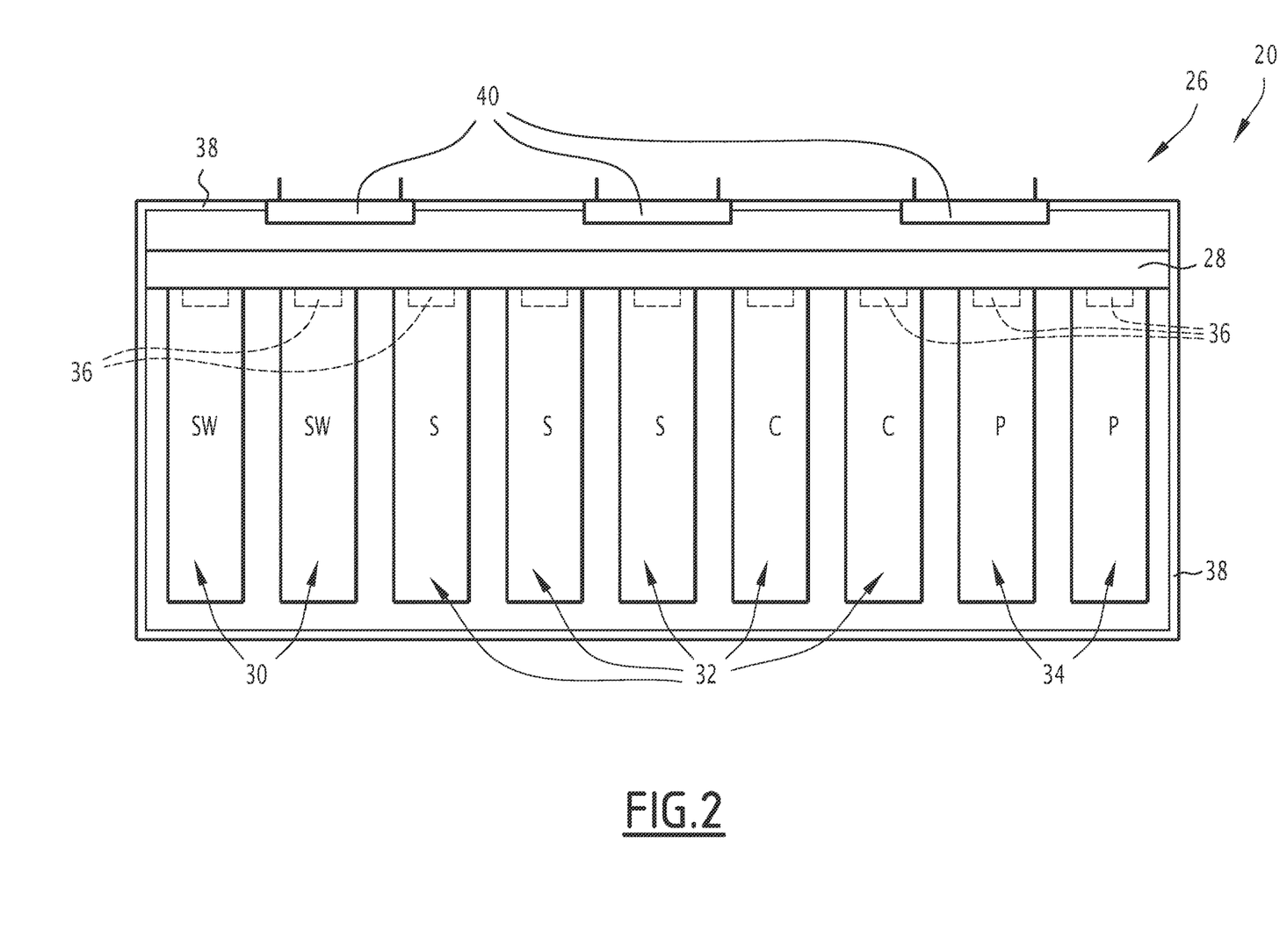
FIG. 2 is a schematic view of an electronics unit forming the multimedia server of FIG. 1, wherein the unit includes a backplane card and a plurality of electronic cards connected to the backplane card.

For example, the multimedia server 20 is in the form of an electronics unit 26 including a backplane card 28, several electronic cards 30, 32, including at least one network switch card 30 and one or more other electronic cards 32 and one or more power boards 34. Each electronic card 30, 32 and each power board 34 is respectively connected to the backplane card 28 via a respective backplane connector 36, as shown in FIG. 2. The electronics unit 26 further includes a protective housing 38 containing the backplane card 28 and the plurality of network switch card(s) 30, other electronic card(2) 32, and power board(s) 34, and external connectors 40 arranged on the periphery of the housing 38. The external connectors 40 are intended, in particular, to allow the multimedia server 20 to be connected to the on-board local-area network, as well as a power grid installed on board the aircraft 10.

The multimedia server 20 preferably comprises several cards 30, 32, 34 of the same functional type selected from the group consisting of: A network switch card 30 (SW), a power board 34 (P), a data storage card S, and a compute card C, all of which can be seen in FIG. 2. In the example of FIG. 2, the multimedia server 20 comprises seven electronic cards 32, divided into two network switch cards 30 (SW), five other electronic cards 32, i.e. three data storage cards S and two compute cards C, as well as two power boards 34, also denoted P.

In particular, the multimedia server 20 preferably comprises several electronic cards 30, 32 of the same type selected from the group consisting of: a network switch card SW, a data storage card S, and a compute card C. Preferably, several electronic cards 30, 32 are of the same functional type for each of the types of the aforementioned group. The plurality of electronic cards 30, 32 includes electronic cards 32 of several types, preferably each of the types included in the aforementioned group.

Persons skilled in the art will thus understand that the presence of several electronic cards 30, 32, 34 of the same functional type improves reliability and availability of the multimedia server 20, given that the cards of the same functional type serve as backup for one another.

Moreover, the presence of an elevated number of cards 30, 32, 34, in particular electronic cards 30, 32, reduces the 'granularity' of each card 30, 32, 34 within the electronics unit 26, and thus the costs and resource requirements involved in ensuring satisfactory redundancy of the cards 30, 32, 34.

The local-area network on board the aircraft 10 is a totally wired network, or a partially wired and partially wireless network, or a totally wireless network.

When the on-board local-area network is partially wired and partially wireless, the multimedia server 20 is, for example, connected in a wired manner to an entertainment terminal of each row of seats, and the terminal with the wired connection to the multimedia server 20 is then connected wirelessly to the other terminals of the row of seats.

For example, each wireless link is a radioelectric link, e.g. a link conforming to at least one of the versions of standard IEEE 802.11, also denoted Wi-Fi™ standard or a link conforming to the Li-Fi standard, e.g. standard IEEE 802.15.7.

For example, the external electronic equipment 22 is a computer portal that is accessible via the external communications network 24 and includes all required versions, i.e. a list of one or more minimum versions necessary for the operation of the group of hardware and/or software function(s) of the multimedia server 20.

For example, the external electronic equipment 22 includes a database 42 in which the group of one or more required versions is stored.

The external communications network 24 includes, e.g., at least one gateway 44, typically arranged within airport infrastructure of the airport 12 to which the multimedia server 20 is suited to be connected via a first respective datalink 46 when the aircraft 10 is on the ground at the airport 12. The gateway 44 is connected to the external electronic equipment 22 via a second datalink 48. The first datalink 46 is a wireless link, preferably secure, as shown in FIG. 1, with a first encryption key 50. The second datalink 48 is a wired or wireless link, preferably wired. The second datalink 48 is preferably also secure, as shown in FIG. 1, with a second encryption key 52.

For example, each electronic card 30, 32 is of the network switch SW or data storage S type, or the compute card C type. In other words, in this example, each electronic card 30, 32 is of a single functional type of the group consisting of: network switch card SW, data storage card S, and compute card C.

Each network switch card 30 is configured to manage communications with at least one of the on-board local-area network and an external communications network 24. Each network switch card 30 is a card associated on the one hand with communications with the on-board local-area network and, on the other, with the external communications network 24. Each network switch card 30 is also suited to shunt data between the aforementioned networks, on the one hand, and the other electronic cards 32, e.g. the data storage cards S and the compute cards C, on the other, i.e. to carry out network switching, such as Ethernet switching.

According to the invention, at least one network switch card 30 further includes a software configuration module 60, wherein the software configuration module 60 is suited to obtain a list of software functions to be installed on at least one other electronic card 32; suited to download, from the electronic equipment 22 external to the multimedia server 20 the one or more software functions from the list obtained; and suited to provide the corresponding downloaded software functions to each other respective electronic card 32.

Figure 3:
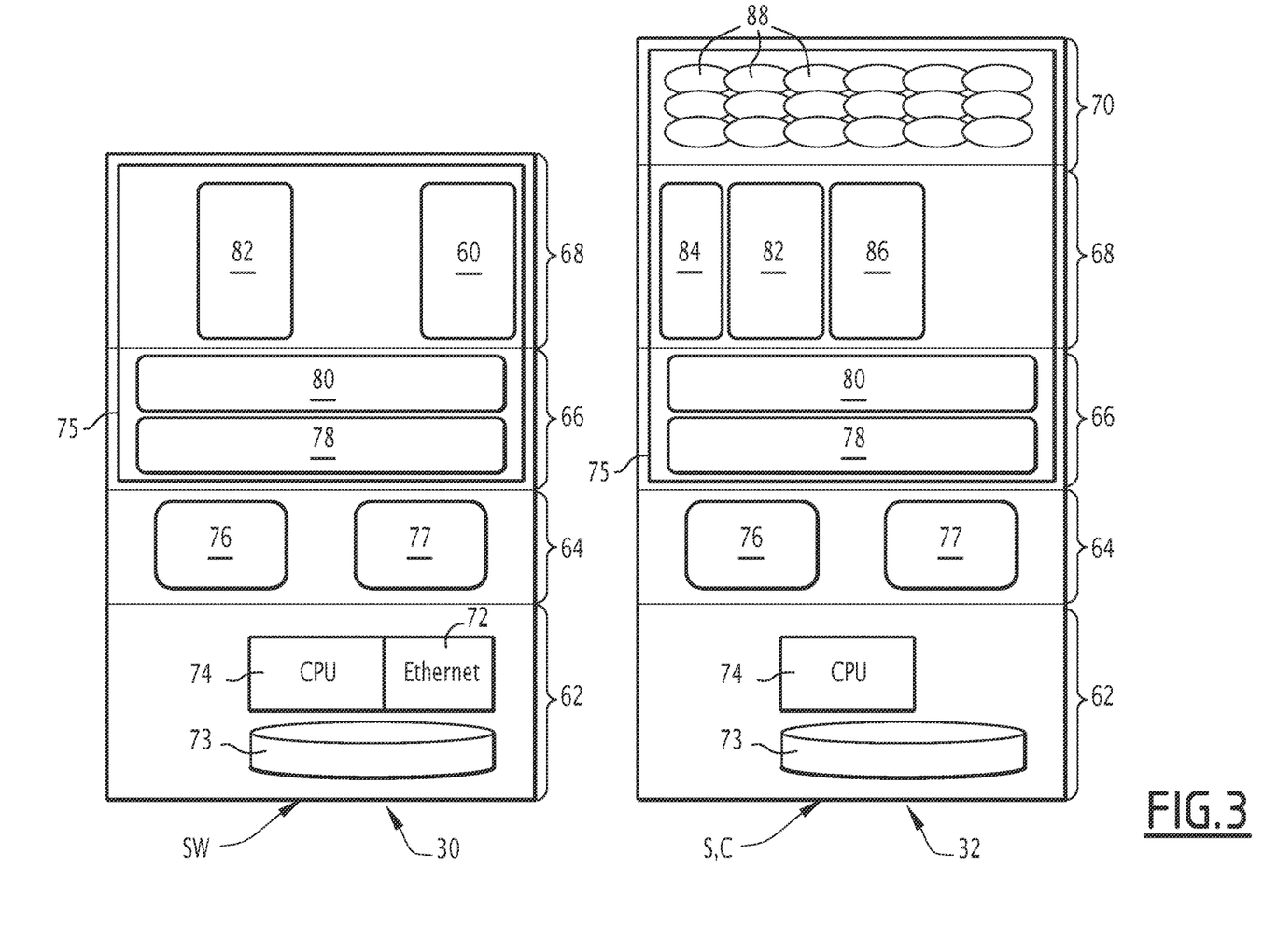
FIG. 3 is a schematic view of a hardware and software architecture of several electronic cards of the unit of FIG. 2, i.e. a network switch card on the one hand, and another electronic card, such as a data storage card and a compute card, on the other.

Preferably, each network switch card 30 includes the software configuration module 60 that can be seen in FIG. 3.

Each network switch card 30 preferably has etching of a greater thickness than that of every other electronic card 32.

Of the other electronic cards 32, each data storage card S is a card dedicated to data storage, in particular of the computerised content for distribution to the entertainment terminals. The data storage card S typically includes one or more memories for mass storage.

Of the other electronic cards 32, each compute card C is a card dedicated to computer calculation, e.g. to carry out processes requiring significant computation resources that are carried out, in particular, on the data stored in a corresponding data storage card S. The compute card C typically includes one or more CPUs, e.g. one or more processors.

In one variant, at least one other electronic card 32 is of at least two functional types of the group consisting of: a data storage card S and a compute card C. Preferably, several other electronic cards 32 are of at least two functional types from the aforementioned group. More preferably, every other electronic card 32 is of at least two functional types from the aforementioned group.

In the example of FIG. 3 (where only one network switch card 30 is shown for simplicity's sake), all of the network switch cards 30 are substantially analogous, or substantially identical; for example, each of them has a hardware and software architecture of the type shown in FIG. 3 (left). In FIG. 3, each network switch card 30 includes a hardware layer 62, a hypervisor layer 64, a low-level software layer 66, and a middleware layer 68, with these four layers 62, 64, 66, and 68 being superimposed on one another.

In the example of FIG. 3 (where only one other electronic card 32 is shown for simplicity's sake), all of the other electronic cards 32 are substantially analogous, or substantially identical; for example, each of them has a hardware and software architecture of the type shown in FIG. 3 (right). In FIG. 3, each other electronic card 32 includes the hardware layer 62, the hypervisor layer 64, the low-level software layer 66, the middleware layer 68, and a high-level software layer 70, with these five layers 62, 64, 66, 68, and 70 being superimposed on one another.

When all of the network switch cards 30 are substantially analogous or substantially identical, the hardware layer 62 of each network switch card 30 includes a network switch unit 72 suited to communicate with the on-board local-area network on the one hand and with the external communications network 24, e.g. an Ethernet switch, a data storage unit 73, e.g. mass storage, and a compute unit 74, e.g. a CPU, such as one or more processors, on the other.

When all of the other electronic cards 32 are substantially analogous or substantially identical, the hardware layer 62 of each other electronic card 32 preferably includes the data storage unit 73 and the compute unit 74.

In the variant in which at least one other electronic card 32 is of at least two functional types, each other electronic card 32 that is of several functional types includes the data storage unit 83 and the compute unit 84.

In the example of FIG. 2, all of the other electronic cards 32 are not substantially identical or analogous, and the hardware architecture of each electronic card thus varies, e.g., from one functional type to another. In other words, in this example, the data storage card S and the compute card C have different hardware architectures, and the data storage cards S and the compute cards C are respectively substantially analogous or substantially identical for each respective functional type.

Each power board 34 is suited to convert electrical energy received from the on-board power grid via one or more respective external connectors 40 into another electrical energy that is delivered to the electronic cards 32. The electrical energy delivered to the electronic cards 32 is typically DC power, and each powerboard 34 then includes an AC-DC converter when the electrical energy received from the power grid is AC, and a DC-DC converter when the electrical energy received is DC.

In the example of FIG. 2, the two analogous powerboards 34 back one another up.

The software configuration module 60 is configured to obtain the list of one or more software functions to be installed on at least one other electronic card 32, to download, from the external electronic equipment 22, the software function(s) from the list obtained, and to provide the corresponding downloaded software function(s) to each respective other electronic card 32. The software configuration module 60 is preferably included in a respective virtual machine 75.

Optionally, the software configuration module 60 is additionally configured to verify the integrity of each downloaded software function, For example, the software configuration module 60 is configured to verify the integrity by preferably by calculating a checksum for each downloaded software function and then comparing each calculated checksum with a respective reference checksum contained in the list obtained.

The hypervisor layer 64 is a virtualisation platform suited to manage one or more virtualised software systems, such as one or more virtual machines 75.

In the example of FIG. 3, the hypervisor layer 64 of each network switch card 30 is suited to manage a respective VM 75 encompassing the low-level software layer 66 and the middleware layer 68. The hypervisor layer 64 of each other electronic card 32 is suited to manage a respective virtual machine 75 encompassing the low-level software layer 66, the middleware layer 68, and the high-level software layer 70.

For example, the hypervisor layer 64 includes a hypervisor 76 and a management virtual machine 77.

The hypervisor layer 64 of each network switch card 30, in particular its management VM 77, is suited, in particular, to download from the external electronic equipment 22 one or more computer files, e.g. an imagine of a respective VM 75, and is suited then to carry out one or more software functions, in particular to run the image of the VM 75, as will be described in greater detail infra in relation to FIG. 5-8.

The hypervisor layer 64 of each other electronic card 32, in particular its management VM 77, is suited, in particular, to communicate with at least one respective network switch card 30 and to request the one or more software functions previously downloaded by the network switch card 30. For example, a downloaded software function an image of a VM 75 suited to be run on the respective other electronic card 32, and the hypervisor layer 64 of the respective other electronic card is then further suited to run the image obtained via the respective network switch card 30.

Each hypervisor layer 64 thus forms firmware that is installed by default on every electronic card 30, 32. In other words, in OOF (Out-of-Factory) configuration, each electronic card 30, 32 includes a hypervisor layer 64 in addition to its hardware layer 62.

For each electronic card 30, 32, the low-level software layer 66 includes a bootloader 78 and a low-level service module 80 that includes, e.g. a kernel, e.g. a Linux kernel, and one or more drivers.

The middleware layer 68 of each network switch card 30 comprises a manager 82 of IT containers and the software configuration module 60. The software configuration module 60 is then included in the virtual machine 75 that encompasses the corresponding low-level software layer 66 and middleware layer 68.

The middleware layer 68 of each other electronic card 32 includes the IT container manager 82, an orchestrator 84, and a file manager 86, with the orchestrator 84 being suited to control one or more unitary services 88, in particular to run such unitary services 88 depending on a service requested by the user of an entertainment terminal, in particular a type (film, TV program, game, music) of multimedia content desired by the user.

The high-level software layer 70 of each other electronic card 32 comprises the unitary services 88, which services 88 correspond to the services provided to the passengers of the aircraft: VOD (video on demand), AOD (audio on demand), games, flight parameters (altitude, speed, etc.) and progress of the flight (e.g. using a moving map), audio and/or video announcements from the crew, etc.

The data storage unit 73 of each network switch card 30 is typically a memory with a low failure rate. In other words, the memory is robust. For example, the data storage unit 73 of each network switch card 30 is a highly resilient non-volatile memory such as FLASH memory, in particular NAND memory.

The data storage unit 73 of each other electronic card 32 preferably is greater in size than each network switch card 30, and is then suited to store more data than the storage unit 73 of each network switch card 30. The data storage unit 73 of each other electronic card 32 is, for example, an SSD (Solid State Drive), or an NVMe Non Volatile Memory express).

Figure 4:
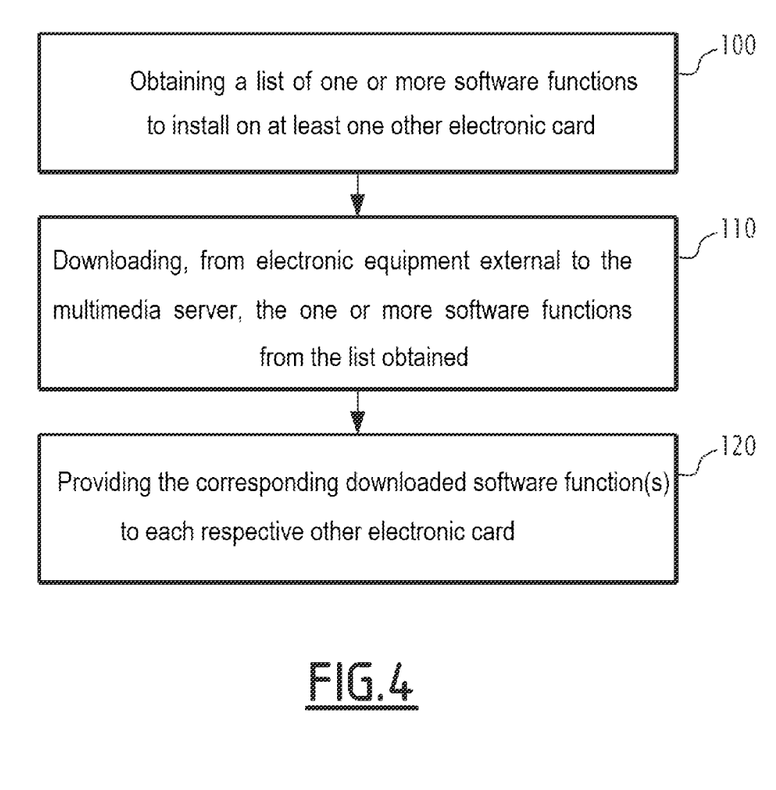
FIG. 4 is a flowchart of a software configuration method according to the invention, with the method being carried out a software configuration module included in the network switch card of FIG. 3.

The operation of the multimedia server 20 will now be explained, in particular by reference to FIG. 4, which shows a flowchart of the software configuration method according to the invention, and to FIG. 5-8, which show successive steps of the software configuration method, with the method being carried out by the multimedia server 20, in particular via the software configuration module 60.

As described supra, initially, i.e. in OOF configuration, each network switch card 30, in addition to its hardware card 62, includes its hypervisor layer 64, and each other electronic card 32 also includes its hypervisor layer 64 in addition to its hardware layer 62.

Figure 5:
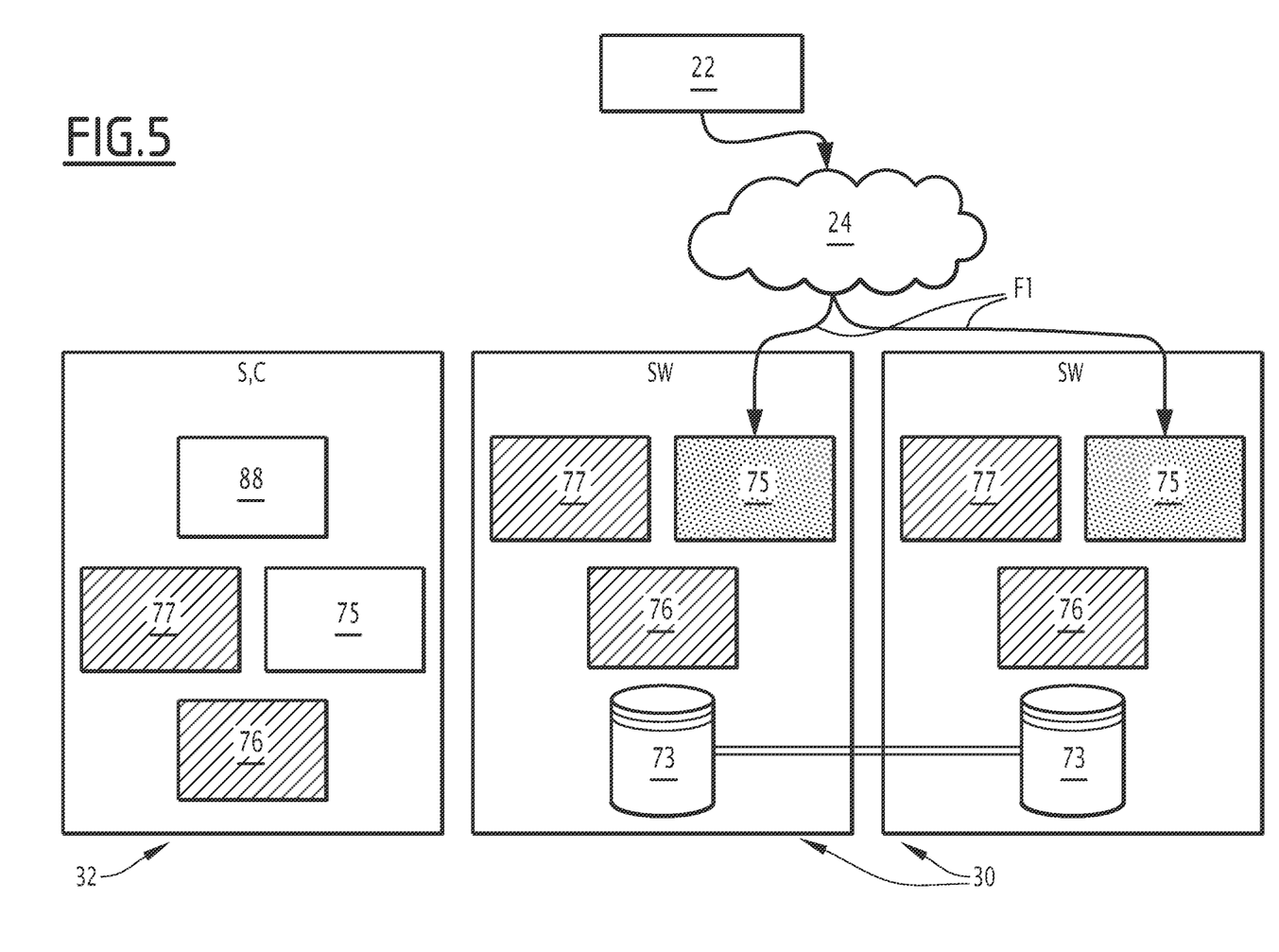
FIGS. 5-8 show successive steps of the software configuration method according to the invention.

When the multimedia server 20 is powered up, if the hypervisor layer 64 of the respective network switch card 30 detects that there is no respective virtual machine 75 for the network switch card 30, the hypervisor layer 64, in particular its management virtual machine 77, begins by downloading, from the external electronic equipment 22, an image of the virtual machine 75, as shown by the arrow F1 in FIG. 5. The hypervisor layer 64 of the or each network switch card 30 then runs the downloaded image of the respective virtual machine 75, in order to render the virtual machine 75 operational.

Figure 6:
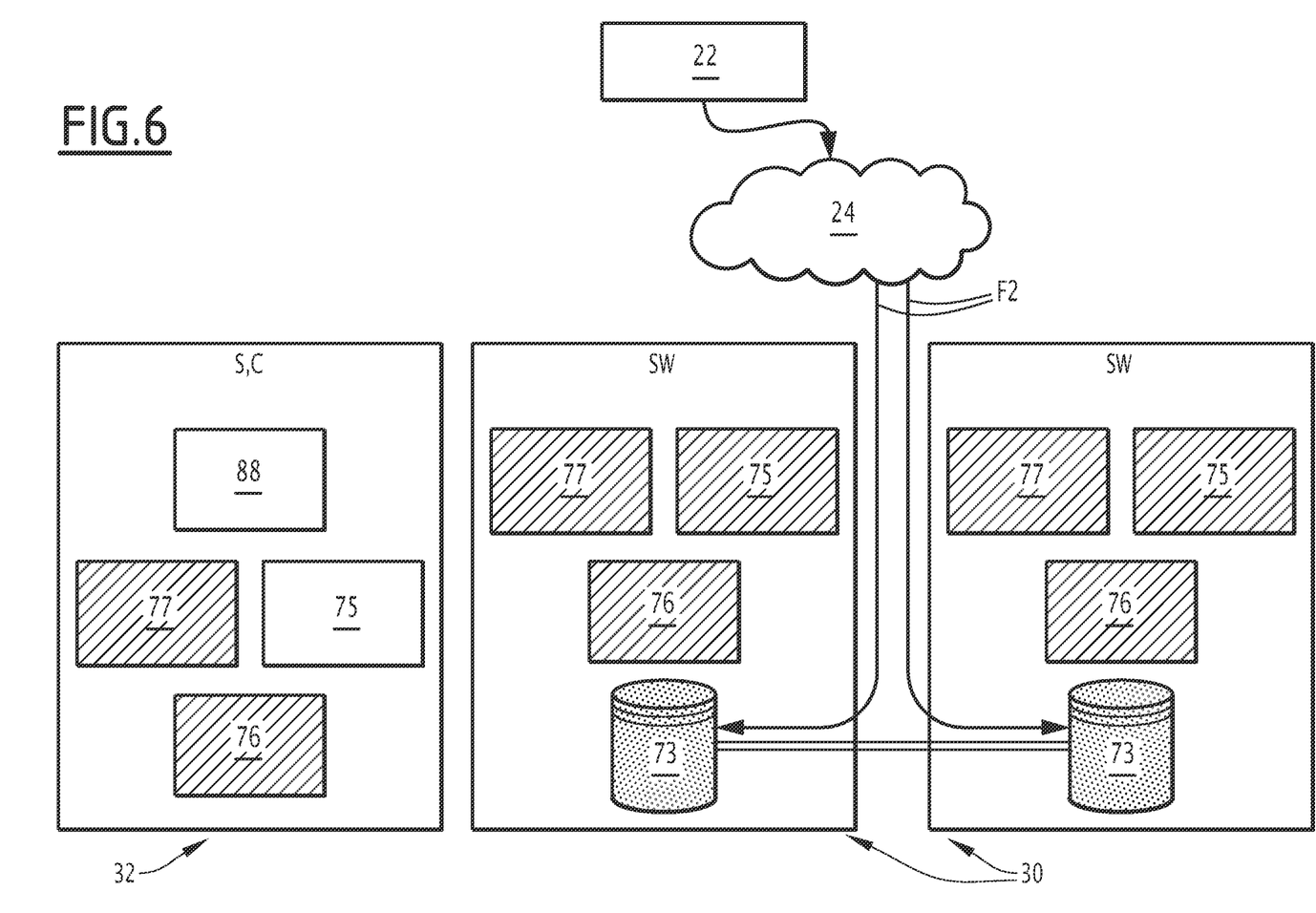
Figure 7:
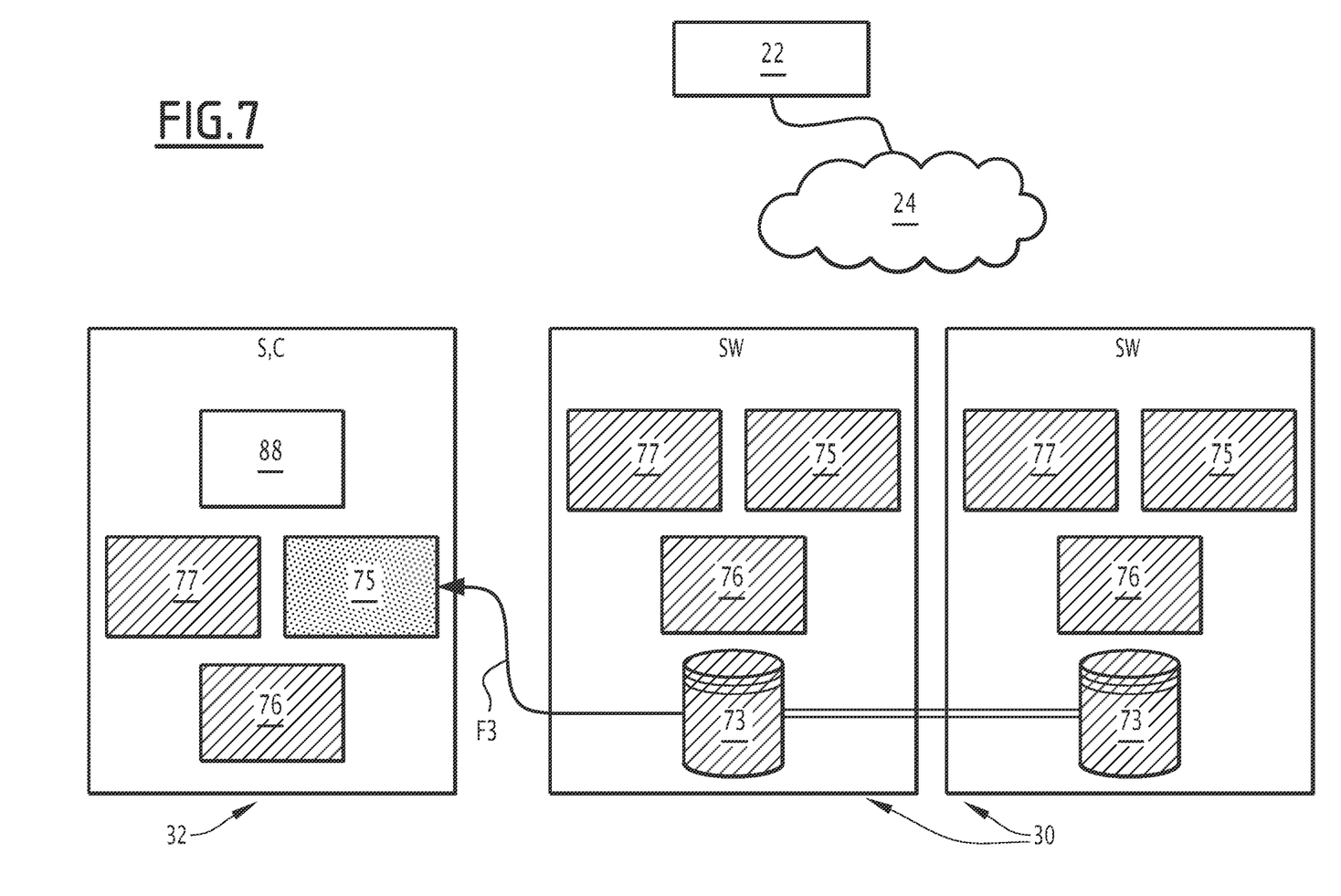
Figure 8:
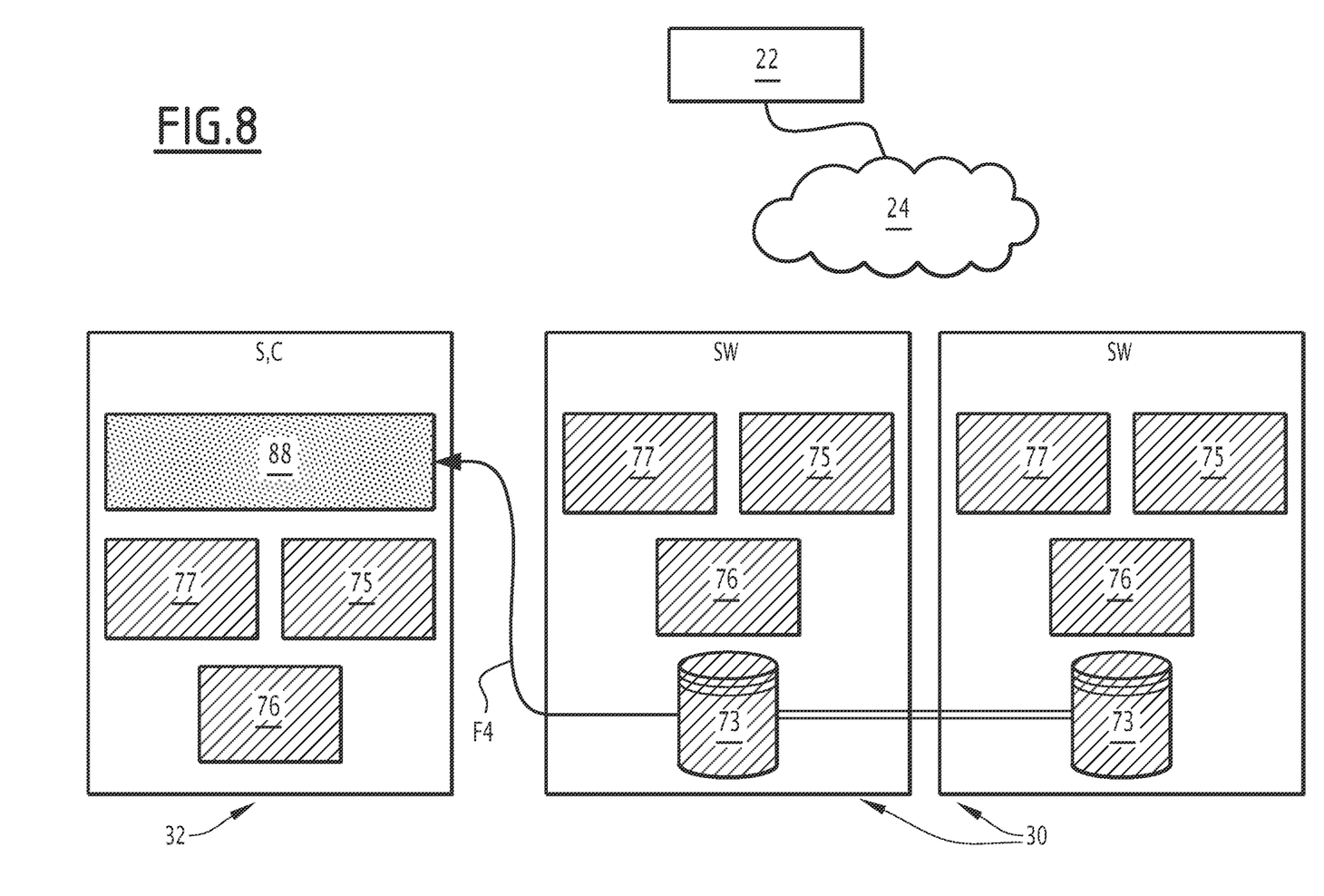

Persons skilled in the art will note that, by convention, in FIG. 5, as well as the following FIG. 6-8, hatched areas correspond to the presence of the corresponding element, e.g. the hypervisor 76 and the management virtual machine 77 of each hypervisor layer 64 in the example of FIG. 5; dotted areas correspond to an element currently being downloaded, e.g. the virtual machine 75 in FIG. 5; and white areas, i.e. areas with no filling, correspond to elements absent from the respective electronic card 30, 32, e.g. the virtual machine 75 and the unitary services 88 of each other electronic card 32, or an element that is empty or is yet to be filled, e.g. the storage unit 73 of each network card 30 in FIG. 5.

Once the virtual machine 75 of the corresponding network switch card 30, in particular the software configuration module 60 included in the VM 75, is downloaded and run, the software configuration method includes an initial step 100 in which the multimedia server 20, in particular the software configuration module 60, obtains the list of one or more software functions to install on at least one other electronic card 32. This list of software functions is obtained, e.g., from the external electronic equipment 22.

Thereafter, in step 110, the software configuration method includes downloading, via the software configuration module 60 and from the external electronic equipment 22, the one or more software functions from the list previously obtained in step 100.

In the example of FIG. 6, the downloading of the software function(s) from the external electronic equipment 22 is carried out simultaneously for each network switch card 30 via the external communications network 24, then via the on-board local-area network, with the software function(s) being downloaded to the data storage unit 73 of each network switch card 30, as shown by the arrow F2.

The software function(s) thus downloaded include, e.g., an image of the VM 75 of each other electronic card 32, such as the data storage card S and the compute card C, update packages for the respective VM 75 of each compute card C, an image of the container manager 82 of each other electronic card 32, configuration packages for the orchestrator 84 of each other electronic card, and an image of the file manager 86 of each other electronic card 32.

In the next step 120, the multimedia server 20, in particular the software configuration module 60, then provides the software functions downloaded in the previous step 110 to each respective other electronic card 32, as shown by the arrow F3 in FIG. 7.

The provision of the corresponding downloaded software function(s) to each respective other electronic card 32 is carried out, e.g. upon request by each respective other electronic card 32. To this end, the hypervisor layer 64 of each respective other electronic card 32, in particular its management VM 77, regularly sends a request to a respective network switch card 30, if it is has previously detected the absence of the respective VM 75 on the other electronic card 32. For example, the management VM 77 of the other electronic card 32 regularly attempts to connect to a server hosted by the corresponding network switch card 30 in order to recover the downloaded software function(s), e.g. in the data storage unit 73, from the external electronic equipment 22.

After installing the respective VM 75 on the respective other electronic card 32, illustrated by the arrow F3 in FIG. 7, the unitary services 88 are then installed on the corresponding electronic card 32, and are also provided by the/each network switch card 30, as shown by the arrow F4 in FIG. 8; these unitary services 88 are also downloaded from the external electronic equipment 22 via the corresponding network switch card 30.

After being downloaded, these unitary services 88 make it possible to offer the passengers of the aircraft 10 a plurality of services, e.g. those described supra, i.e. VOD, AOD, games, flight parameters, etc.

Thus, the multimedia server 20 according to the invention and the software configuration method carried out by this multimedia server, in particular by the software configuration module 60, make the software configuration of the server 20, in particular the initial software configuration of the server 20 after leaving the factory, i.e. after manufacture, easier and more reliable. This software configuration is carried out via the/each network switching card 30, which, in addition to its network switching capabilities, further includes the software configuration module 60, which makes it possible to facilitate the software configuration of the multimedia server 20, given that the network switch card 30 is now configured to connect to the networks to which it is capable of connecting, e.g. the on-board local-area network, or the external communications network 24.

When the multimedia server 20 optionally additionally includes at least two network switch cards 30, each backing up the other, the reliability of the multimedia server 20, and in particular its software configuration, is also improved.

When the software configuration module 60 is additionally optionally included in the respective virtual machine 75 of the corresponding network switch card 30, the reliability of the multimedia server 20, in particular its software configuration, is also further improved.

Indeed, the virtualisation provided by the hypervisor layer 64 provides a layer of abstraction above the hardware layer 62. Thus, the software layers 66, 68, and, if applicable, 70, are in the form of a respective virtual machine 75, thus facilitating their maintenance compared to a software environment that depends directly on the hardware layer 62.

Thus, it can be seen that the multimedia server 20 according to the invention, and, in particular, the software configuration module 60, allow for easier management of the software configuration of the server 20, in particular its initial software configuration after leaving the factory.

The invention claimed is:

1. A Multimedia server aiming at being installed on board an aircraft and connected to at least one entertainment terminal installed on board the aircraft via an on-board local-area network, wherein the multimedia server comprises:
    at least one network switch card configured to manage communications with at least one network of the on-board local-area network and an external communications network, and
    at least one other electronic card selected from the group consisting of: a data storage card and a compute card, wherein at least one network switch card further includes a software configuration module, wherein the software configuration module is adapted to obtain a list of software function(s) to be installed on at least one other electronic card; adapted to download, from electronic equipment external to the multimedia server, the one or more software functions from the list obtained; and adapted to provide the corresponding downloaded software function(s) to each other respective electronic card,
    wherein each network switch card further includes a same software configuration module, and
    wherein several other electronic cards are network switch cards.

2. The multimedia server according to claim 1, wherein the software configuration module is included in a virtual machine.

3. The multimedia server according to claim 2, at least one respective network switch card including a hypervisor layer adapted to download, from the external electronic equipment, an image of the virtual machine and then to run the image of the virtual machine.

4. The multimedia server according to claim 1, wherein the software configuration module is further adapted to verify the integrity of each downloaded software function.

5. The multimedia server according to claim 1, wherein the software configuration module is further adapted to verify the integrity of each downloaded software function by calculating a checksum for each downloaded software function and then comparing each calculated checksum with a respective reference checksum contained in the obtained list.

6. The multimedia server according to claim 1, wherein each other electronic card includes a hypervisor layer adapted to communicate with the network switch card and to request the one or more software functions previously downloaded by the network switch card.

7. The multimedia server according to claim 6, wherein a downloaded software function is an image of a virtual machine suited to be run on the respective other electronic card, and the hypervisor layer of the respective other electronic card being then further adapted to run the image obtained via the respective network switch card.

8. The multimedia server according to claim 7, wherein if the hypervisor layer of the respective network switch card detects an absence of a respective virtual machine for the network switch card, the hypervisor layer starts by downloading, from external electronic equipment, an image of the virtual machine.

9. The multimedia server according to claim 1, wherein the multimedia server is in the form of an electronics case including a backplane card and a plurality of electronic cards connected to the backplane card, each electronic card being selected from the group consisting of: a network switch card, a data storage card, and a compute card.

10. The multimedia server according to claim 9, wherein the plurality of electronic cards includes electronic cards of various types.

11. The multimedia server according to claim 9, wherein the plurality of electronic cards includes electronic cards of each of the types, of the group consisting of: the network switch card, the data storage card, and the compute card.

12. The multimedia server according to claim 1, wherein several additional other electronic cards are of the same type selected from the group consisting of: a data storage card, and a compute card.

13. The multimedia server according to claim 12, wherein several electronic cards are of the same type for each of the types of the group consisting of: the network switch card, the data storage card, and the compute card.

14. An electronic entertainment system aiming at being installed on board an aircraft, wherein the system comprises:

at least one entertainment terminal; and a multimedia server connected to each entertainment terminal via an on-board local-area network, the multimedia server being according to claim 11.

15. A method for software configuration of a multimedia server aiming at being installed on board an aircraft and connected to at least one entertainment terminal installed on board the aircraft via an on-board local-area network, the multimedia server comprising at least one network switch card configured to manage communications with at least one network of the on-board local-area network and an external communications network, and at least one other electronic card selected from the group consisting of: a data storage card and a compute card, at least one network switch card further including a software configuration module;

wherein the method is carried out by the software configuration module and includes the following steps:

obtaining a list of software function(s) to be installed on at least one other electronic card;

downloading, from an external electronic equipment, the one or more software functions from the list obtained; and providing the one or more corresponding downloaded software functions to each respective other electronic card, wherein each network switch card further includes a same software configuration module, and wherein several other electronic cards are network switch cards.

16. A non-transitory computer program including software instructions that, upon being executed by a computer, carry out the method according to claim 15.

\* \* \* \* \*